UNITED STATES PATENT OFFICE.

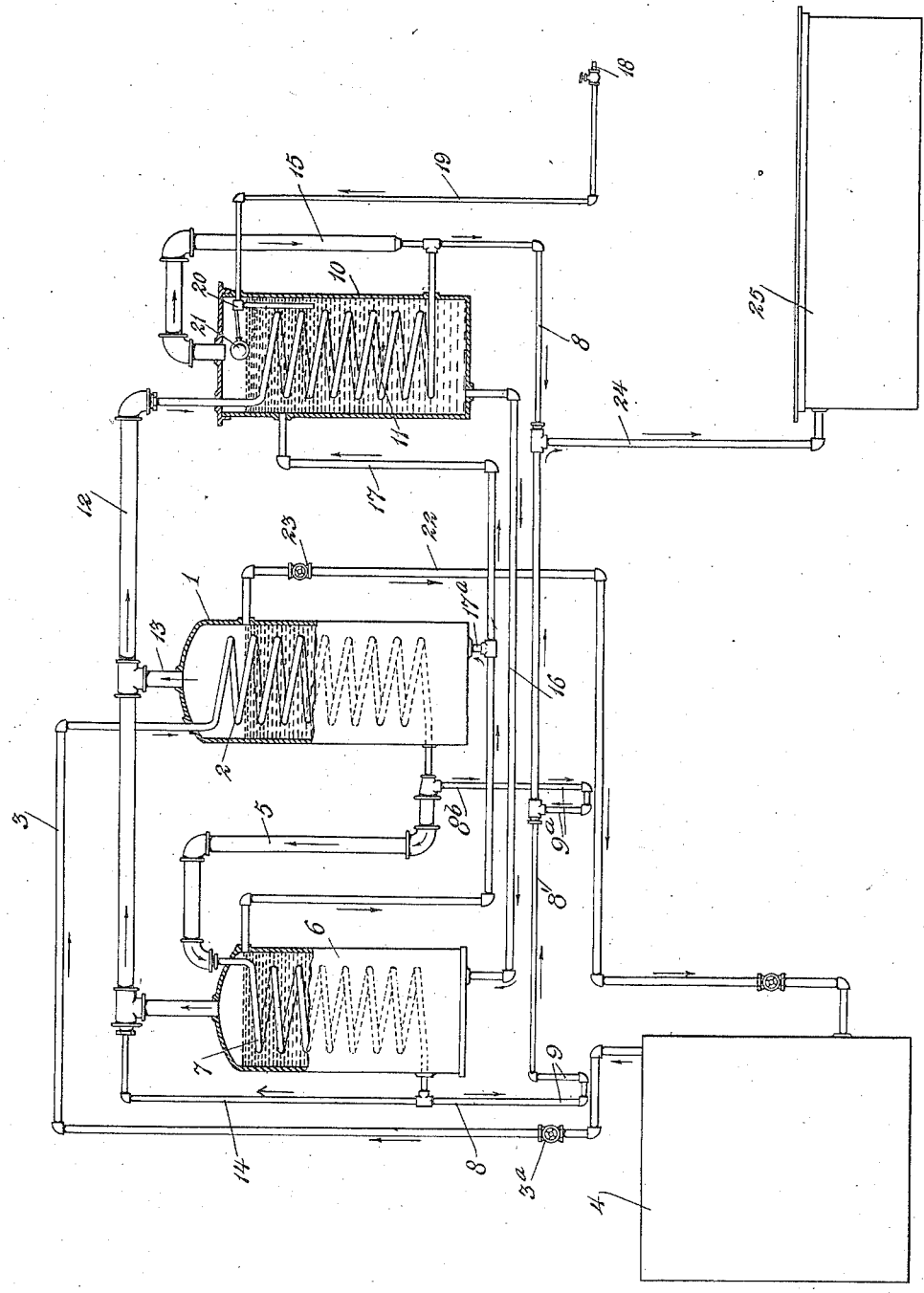

GEORGE B. FURMAN, OF EAST ORANGE, NEW JERSEY.

WATER-DISTILLING APPARATUS.

1,268,233.         Specification of Letters Patent.     Patented June 4, 1918.

Application filed August 25, 1915. Serial No. 47,308.

*To all whom it may concern:*

Be it known that I, GEORGE B. FURMAN, a citizen of the United States, and resident of East Orange, county of Essex, and State of New Jersey, have invented a new and useful Improvement in Water-Distilling Apparatus, of which the following is a specification.

My invention relates to apparatus intended primarily for the distillation of water or other liquids and has for its object to provide an improved construction in which the distillation and condensation is carried out in a simplified and efficient manner and loss by evaporation is entirely avoided. Other objects of my improvement will appear from the description hereinafter and the features of novelty will be pointed out in the appended claim.

Reference is to be had to the accompanying drawing which diagrammatically represents an example of my improved apparatus.

In the illustrative example 1 represents an upright main condensation tank which contains a coil 2 extending lengthwise thereof and having its upper end connected with a pipe 3, the latter preferably being provided with a controlling valve 3ᵃ and entering said tank 1 through its upper end and communicating with a source of steam or means for converting water or other liquids into steam or vapor which in the illustrated example is indicated as the steam chamber or boiler of an ordinary steam furnace 4. The lower end of the coil 2 is extended through the tank 1 near the lower end thereof and connected with a pipe 5 which extends upwardly and is connected with a coil 7 located within a closed auxiliary condensation tank 6, said coil extending lengthwise of said tank 6 and having its upper end extended through the upper end of said auxiliary tank into connection with said pipe 5. The lower end of said coil 7 is extended through the tank 6 near the bottom thereof and into connection with a pipe 8 which extends downwardly to a trap 9 and then continues along in the form of a pipe 8'—8" which is connected with the lower end of a coil 11 located in and extending lengthwise of another auxiliary condensation tank 10 and having its lower end extending through the tank 10 near the lower end thereof. A pipe 8ᵇ extends from the pipe 5 and is formed with a trap 9ᵃ which in turn is connected with the pipe 8'. The upper end of the coil 11 passes out of the upper end of the tank 10 and is connected with a pipe 12 which in turn is connected with the upper end of the tank 6 so as to communicate with the interior thereof and by means of a branch 13 with the upper end of the main tank 1 so as to also communicate with the interior of the latter. A pipe 14 extends from the pipe 12 to the pipe 8 and establishes communication therebetween while a pipe 15 connects the pipe 8 with the top of the tank 10 so as to communicate with the interior thereof. Another pipe 16 extends from the bottom of the tank 6 to the bottom of the tank 10 and has its opposite ends in communication with the interior of said tanks 6 and 10 as shown in the drawing. In addition to the above a pipe 17 has its opposite ends connected respectively with the tank 6 and the tank 7 at intermediate points thereof and somewhat nearer the tops of said tanks in the illustrated example, a branch 17ᵃ extending from said pipe 17 through the bottom of the tank 1 into communication with the interior thereof. The tank 10 is further connected with a source of water supply 18 by means of a pipe 19 which is provided interiorly of the tank 10 with a valve 20 automatically controlled in any suitable manner as by means of a float 21 whereby the supply of water is automatically cut off when a predetermined level has been reached in said tanks as will be more fully described hereinafter. To complete the circuit a pipe 22 having a controlling valve 23 extends from the upper portion of the tank 1 back to the boiler 4, the said pipe 22 being connected with the tank 1 at a point preferably corresponding to the level of the point of connection of the pipe 17 with the tank 6. A pipe 24 connects the pipe 8'—8" with a storage vessel 25 or other point at which the distilled water is to be stored or used.

In operation cold water is admitted through the pipe 19 to the tank 10 and passes from there through the pipe 16 to the tank 6, the level of the water gradually rising in these two tanks 6 and 10 until it reaches the ends of the pipe 17 whereupon it flows through said pipe 17 and through the branch 17ᵃ into the tank 1. The water now continues to flow into the tank 1 until the level in the three tanks is the same, after which the valve 20 will be gradually closed until the supply of water through the pipe 19 is shut off. In this condition the coils 2, 7 and 11 are substantially submerged and the level of the water in all three tanks stands at about the point at which the pipe 22 is connected with the tank 1. If the valve 23 is open this water will flow through said pipe 22 into the boiler 4 or other medium in which it is to be converted into steam, so that the supply therein may be regulated and kept constant. As steam is generated in the boiler 4 and the valve 3$^a$ is open it will flow through the tube 3 into the coil 2 in the tank 1 and owing to the presence of the cold water therein which surrounds said coil will become condensed. The condensed steam which is now distilled water flows down through the coil 2 into the pipe 8$^b$ and through the trap 9$^a$ to the pipe 8' from which it flows through the pipe 24 to the storage vessel 25. Such steam or uncondensed vapors as pass along with the distilled water through the coil 2 after leaving the same pass upwardly through the pipe 5 and into the coil 7 in the tank 6. In passing through this coil 7 which is also surrounded by cold water the process of condensation is continued so that the additional distilled water flows through the pipe 8 and trap 9 to the pipe 8' and from there through the pipe 24 to the storage vessel 25. The trap 9$^a$ being full of water will not interfere with the passage of the distilled water from the trap 9 through the pipe 8' to the pipe 24. Both of the traps 9 and 9$^a$ serve to retain any slight impurities which may be carried along with the distilled water in its passage through the coils 2 and 7. If it should happen that the process of condensation is not fully completed in the coil 7 such vapors as may remain will pass therefrom through the pipes 14 and 12 to the coil 11 located in the tank 10 and also surrounded by cold water. As these vapors pass through said coil 11 the heat is fully extracted therefrom so that the process of condensation is fully completed and the additional distilled water passes from the coil 11 to the pipe 8 and from there through the pipe 24 also to the storage vessel 25. As the very hot steam passes into the coil 2 the water surrounding the same will be converted into steam which fills the space in the tank 1 above the water therein and then passes through the branch 13 to the pipe 12 from which it flows through the coil 11 in the tank 10 and is condensed into distilled water which also flows through the pipes 8 and 24 to the vessel 25. Owing to the fact that the steam in the space at the upper end of said tank 1 contacts with the upper end of the coil 2 through which the hottest steam is passing, the said steam in said tank 1 becomes highly superheated and thus extracts the heat from the steam in said coil 2 to a maximum degree and in a minimum of time. In this manner the steam passing through the coil 2 is condensed to a high degree and only a small proportion thereof of a lower temperature reaches the coil 7 in the tank 6. Here also the water is partly converted into steam which fills the space above the water therein and passes through the pipe 12 to the coil 11 in which this steam is also condensed. The resulting distilled water also passes from said coil 11 through the pipes 8 and 24 to the vessel 25. Similarly any steam which may form in the tank 10 above the water therein will pass through the pipe 15 and in its passage therethrough becomes condensed and thus also flows as distilled water through the pipes 8 and 24 to the vessel 25. It will be understood that owing to the fact that the tank 10 is in direct communication with the water supply, the water therein is relatively colder than in the other tanks so that any steam which reaches the coil 11 is fully and quickly condensed and only a small portion of the water in the tank 10 is converted into steam which is also easily and fully condensed in its passage through the exposed pipe 15.

As the water level in the tanks drops because of the passing off of some of said water in the form of steam as described, the float 21 will gradually drop and the valve 20 will be opened so that additional water will be supplied to the tanks in the same way as described hereinbefore to replace such water as may have become vaporized or converted into steam. The supply of water or the level thereof is thus automatically maintained at a substantially constant point in the tanks, the same being true of the boiler 4 which, if the valve 23 is permitted to remain open, is kept constantly supplied with water preheated in the tank 1. The supply of steam or vapor to the coil 2 in the tank 1 may be cut off by closing the valve 3$^a$. As shown in the drawing the tank 1 is preferably somewhat higher than the other tanks in order that the relatively larger expansion which occurs therein as the water is converted into steam, which in turn is superheated by the steam passing into the coil 2 may be properly accommodated. In some instances the tanks may all be of the same general dimensions.

It will be seen that with my apparatus the condensation takes place in closed tanks in which a constant supply of water is automatically maintained and in which no loss occurs by evaporation or from any other cause. It will further be evident that with my improved arrangement a maximum amount of distilled water is at all times produced which is withdrawn from the system immediately after being distilled and that such water in the tanks as may be converted into steam is itself condensed to provide additional distilled water. The apparatus thus possesses a very high efficiency and reduces the percentage of loss from any cause to a minimum. The apparatus may be used anywhere where a supply of highly distilled water is desired and is also capable of being used for distilling liquids other than water.

Various changes in the specific form and arrangement shown and described may be made within the scope of the claim without departing from the spirit of my invention.

I claim:

In an apparatus for distilling water, a main tank, a first auxiliary tank, a second auxiliary tank, means for conducting water to one of said auxiliary tanks, a connection between all of said tanks whereby water is conducted thereto, means for automatically controlling said water conducting means whereby the level of the water in all of said tanks is maintained at a substantially constant level, a steam boiler, a main condensing coil in said main tank connected with said boiler, an auxiliary condensing coil in said first auxiliary tank connected with said main condensing coil, a pipe connected with said auxiliary coil for conducting the condensate of the steam therefrom, a connection between said pipe and said main coil for conducting the condensate therefrom, a third coil in said second auxiliary tank, a connection between said third coil and said main and first auxiliary tanks for conducting vaporized water to said third coil to condense same, and a connection from said third coil to said pipe whereby the condensate of the vaporized water is added to the condensate of the steam.

In testimony whereof, I have hereunto set my hand.

GEORGE B. FURMAN.